Feb. 6, 1934.   I. H. ATHEY   1,946,122
TRUSS WHEEL CONSTRUCTION
Filed Oct. 1, 1928   5 Sheets-Sheet 3
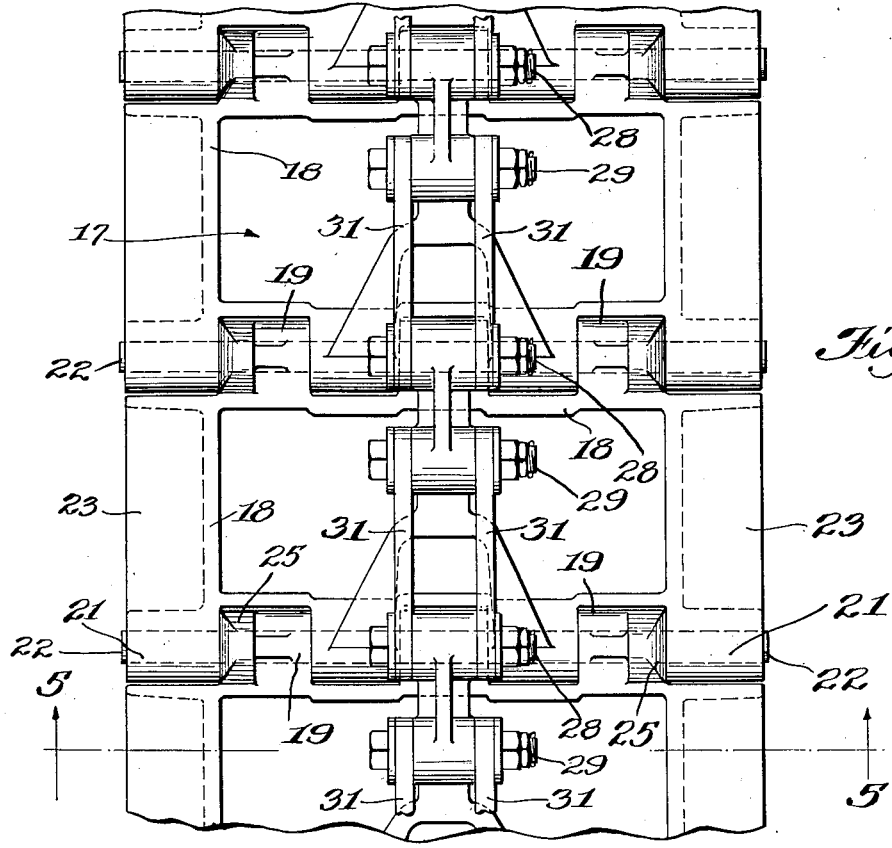
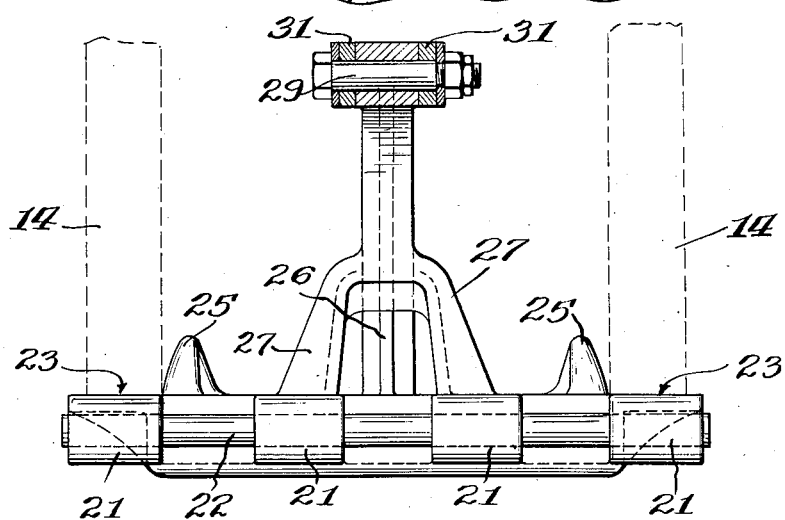
Inventor
Isaac H. Athey
By Williams, Bradbury, McCaleb & Hinkle
Attys.

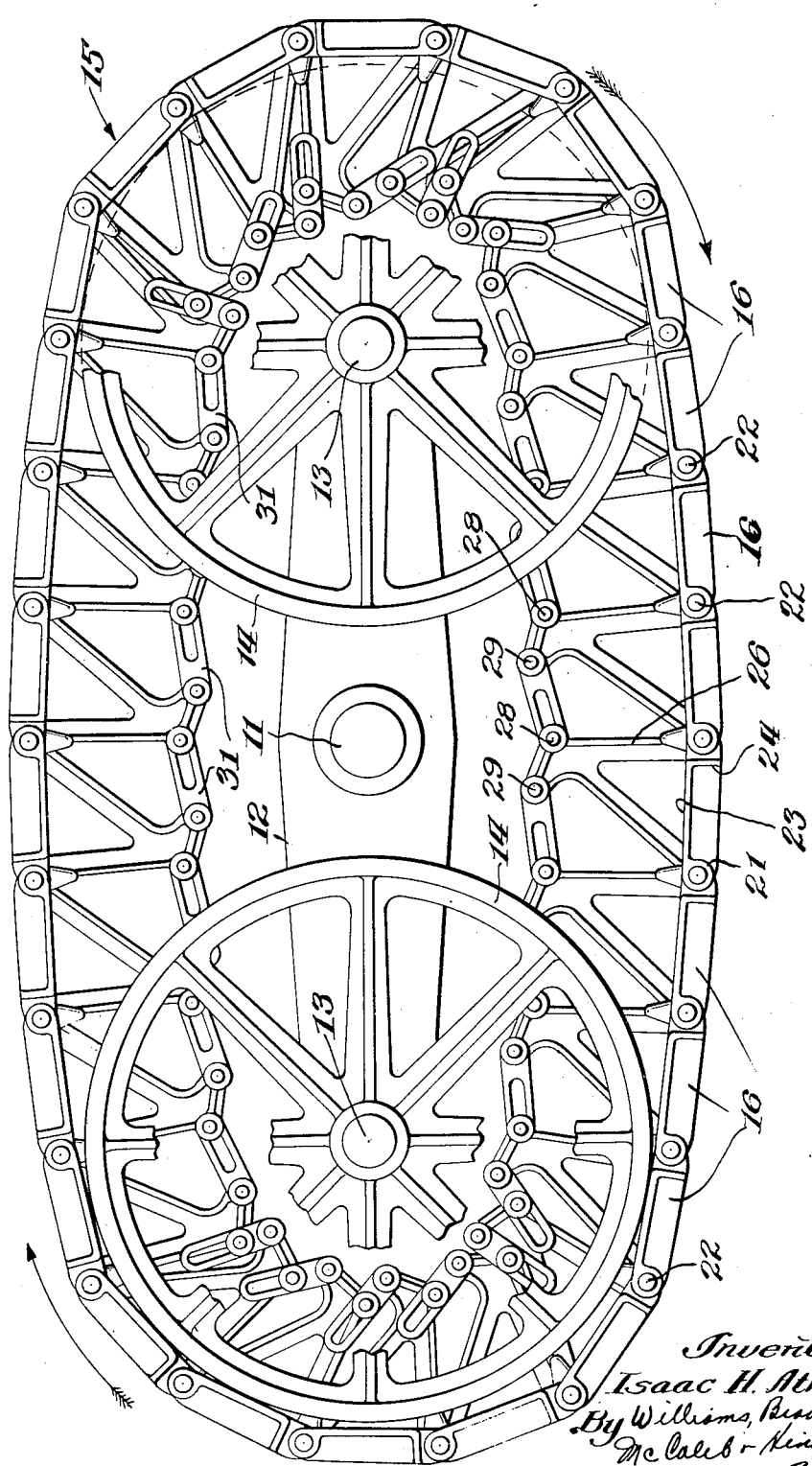

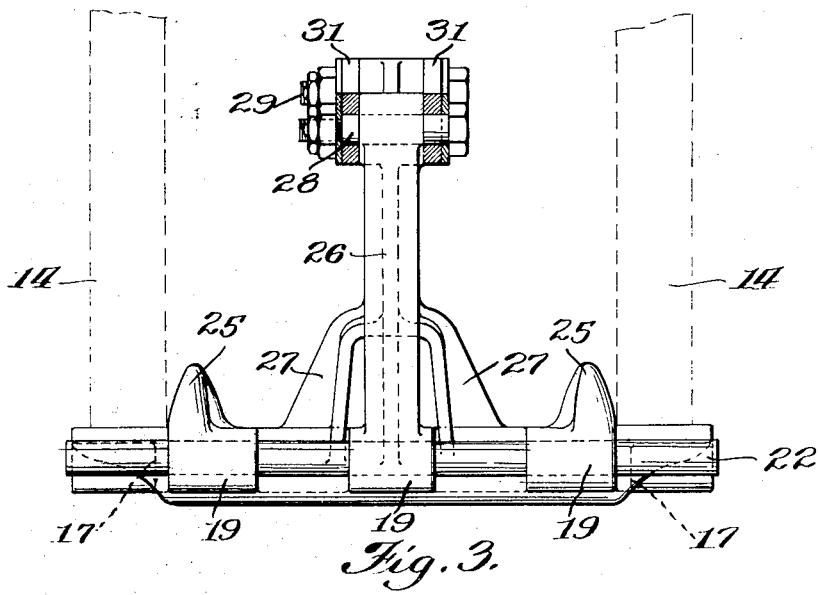
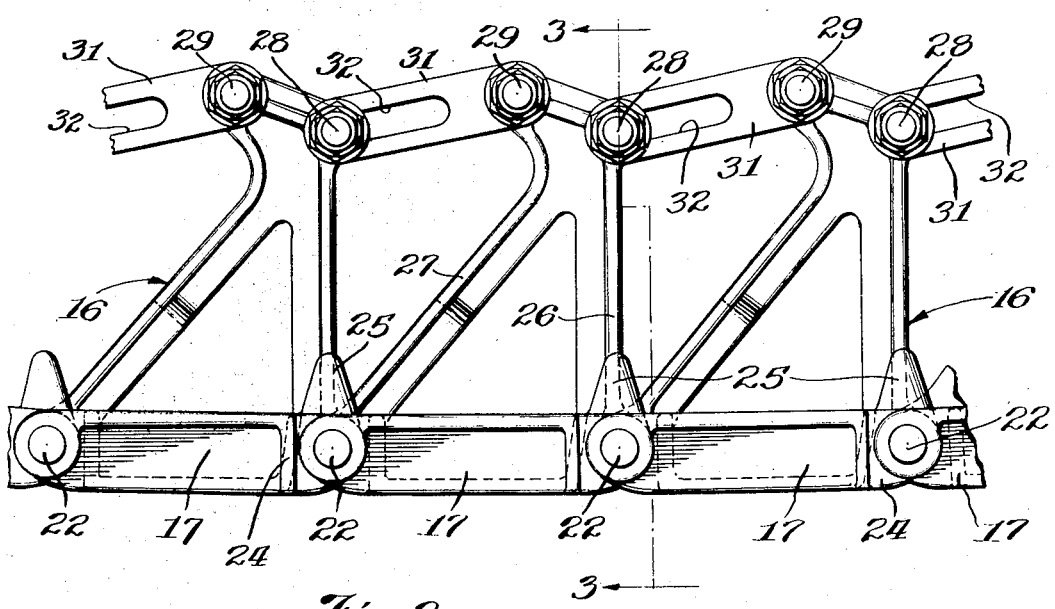

Inventor
Isaac H. Athey
By Williams, Bradbury, McCaleb & Hinkle
attys.

Feb. 6, 1934.　　　　I. H. ATHEY　　　　1,946,122
TRUSS WHEEL CONSTRUCTION
Filed Oct. 1, 1928　　　5 Sheets-Sheet 5

Inventor
Isaac H. Athey
By Williams, Bradbury, McCaleb & Hinkle
Attys.

Patented Feb. 6, 1934

1,946,122

UNITED STATES PATENT OFFICE 1,946,122

TRUSS WHEEL CONSTRUCTION

Isaac H. Athey, Chicago, Ill., assignor to Athey Truss Wheel Co., Chicago, Ill., a corporation of Illinois Application October 1, 1928. Serial No. 309,413

3 Claims. (Cl. 305—10)

My invention relates to improvements in vehicles, and is particularly concerned with improvements in vehicles of the type in which an endless flexible track passes about and supports the load supporting wheels.

An object of the invention is to provide an improved running gear for a vehicle.

A further object is to provide an endless track chain provided with a plurality of truss arms having a single link interconnecting adjacent arms to maintain the chain rigid between the points of support of the load.

A further object is to provide an extremely light endless track chain, the shoes of which are so constructed as to have a high degree of strength in relation to their weight.

A further object is to provide an endless track chain comprising a plurality of shoes having inwardly extending truss arms which are interconnected by a single link allowing the truss arms to collapse about a short radius.

A further object is to provide an endless track chain in which all of the shoes have the same construction to simplify manufacturing and reduce the cost of production. In accordance with the general features of the invention an extremely light track chain is provided by employing a tread member having a flat central portion surrounded by a reinforcing flange which is adapted to receive the stresses communicated to the tread member by the truss arms which are supported by the flange.

Other features and advantages of the invention will appear as the description proceeds.

In the drawings,

Fig. 1 is a side elevation of a vehicle embodying the invention with parts broken away to show the chain collapsed about the wheels;

Fig. 2 is an enlarged side elevation of a portion of the endless track chain;

Fig. 3 is an end elevation and partial section of a shoe of the endless track chain taken generally on line 3—3 of Fig. 2;

Fig. 4 is a plan view of a portion of the chain shown in Fig. 2;

Fig. 5 is an end elevation and partial section of a shoe taken generally on the line 5—5 of Fig. 4;

Figure 7:
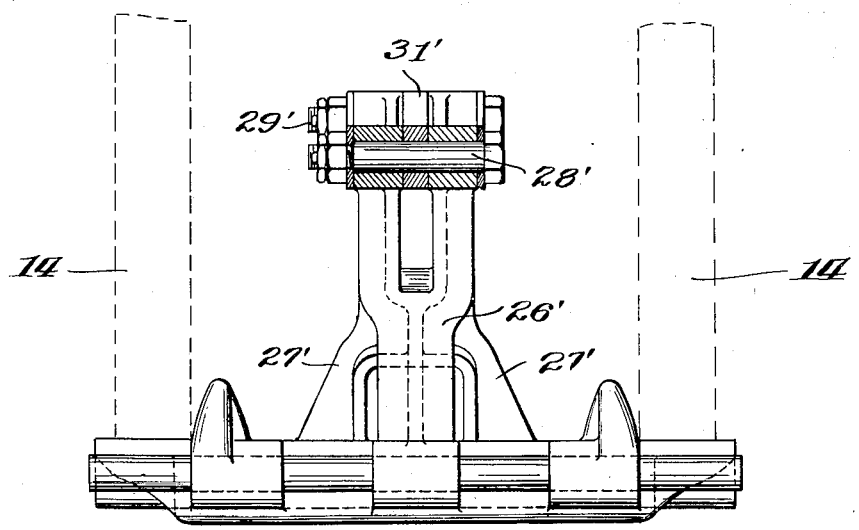
Fig. 7 is an end elevation and partial section taken generally on line 7—7 of Fig. 6.

Referring to the drawings, in which similar reference characters represent the same parts in the several views, I have illustrated my invention in connection with a vehicle which comprises an axle 11 for supporting the load carrying frame not shown. A beam 12 is pivotally mounted upon the axle 11 and carries a shaft 13 at each end thereof. The ends of these shafts project from opposite sides of the beam 12 and each shaft carries a pair of load supporting wheels 14 which roll upon the endless track 15.

Track 15 comprises a plurality of shoes 16. Each of shoes 16 has a flat central portion 17 forming a tread member which is surrounded by an inwardly extending flange 18. The forward end flange is provided with three bearing lugs 19 integral with the flange, and the rearward end flange is provided with four bearing lugs 21 integral with the flange and spaced so as to dovetail with the forward bearing lugs of the adjacent shoe.

A pintle 22 passes through the dovetailed bearing lugs and pivotally interconnects all of the tread members to form an endless chain. Extending laterally from the upper edge of each of the side flanges of a shoe is a ledge 23 which forms a rolling surface for wheels 14. The ledge is supported at its forward end by a bracket 24 and its rearward end is supported by side bearing lugs 21. For the purpose of guiding wheels upon the lateral ledges of the shoes, a guide lug 25 is carried by the bearing lugs 19 adjacent the sides of the shoe.

A truss arm 26 rests with its base upon a bearing lug 19 and extends inwardly from the tread member. A bifurcated truss arm 27 is supported upon two bearing lugs 21 and extends inwardly at an angle to the truss arm 26, joining arm 26 and forming a right angled triangle of which arm 27 extends along the hypotenuse. The truss arms carry at their ends a pivot pin 28 which is in direct vertical alignment with a pintle 22. The truss arms also carry a second pivot pin 29 which is spaced rearwardly from the pivot pin 28 and at a greater distance from the tread member than pivot pin 28. A pair of links 31 is pivotally mounted upon the pivot pin 29 and each link has a longitudinal slot 32 at its opposite end which engages the pivot pin 28 of an adjacent shoe. Since the pivot pin 29 is spaced at a greater distance from the tread member than the pivot pin 28, the links 31 will be inclined to the horizontal, and when the angle between two adjacent shoes is decreased, pivot pin 28 will move along the longitudinal slots in the links 31, causing the arms to move outwardly about the pivot pin 29 so as to clear the pivot pin and links of the adjacent shoe.

In this construction the flat central portion of the tread member does not directly support any other portion of a shoe and therefore can be made very light. The truss arms bearing lugs, ledges and guide lugs are all supported upon the reinforcing flange surrounding the flat central portion. The single link connecting the adjacent shoes further adds to the lightness and compactness of the track construction.

Figure 6:
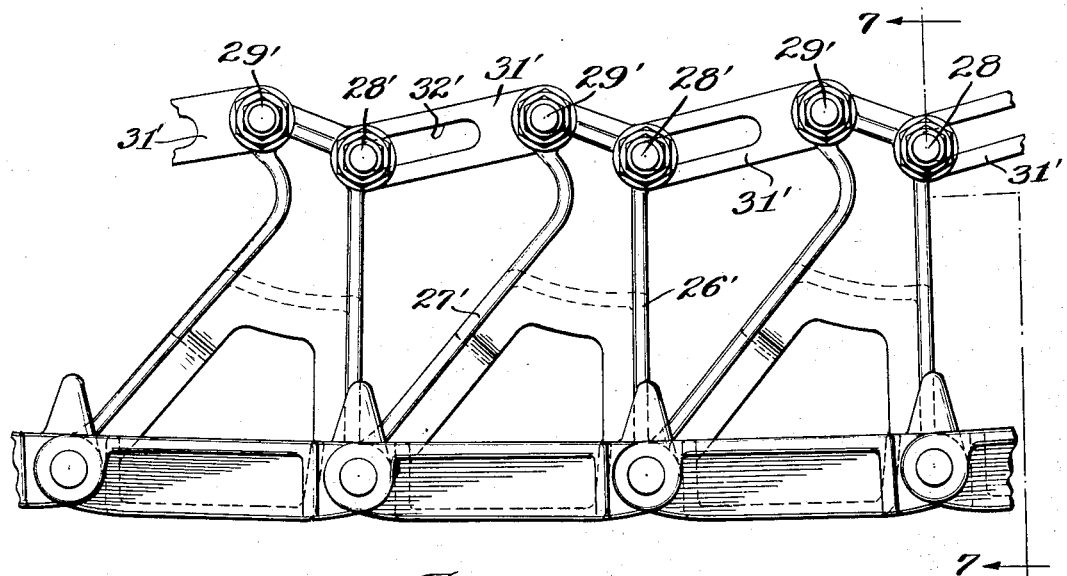
Fig. 6 is a side elevation of a portion of an endless track chain showing a modified form of shoe.
Figure 8:
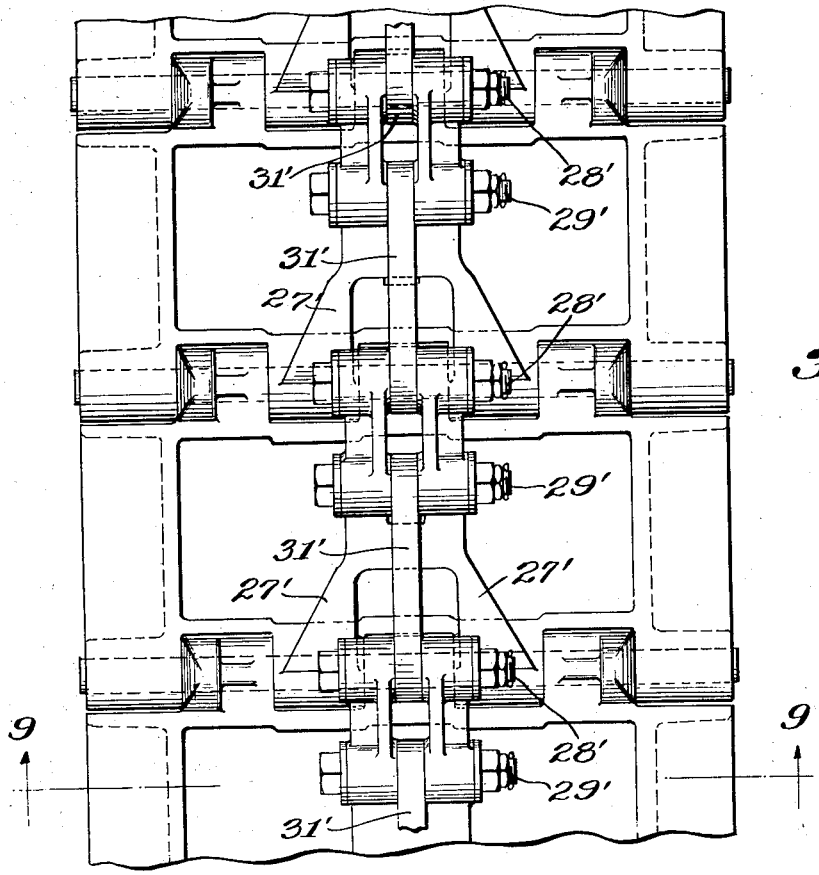
Fig. 8 is a plan view of the portion of the chain shown in Fig. 6.
Figure 9:
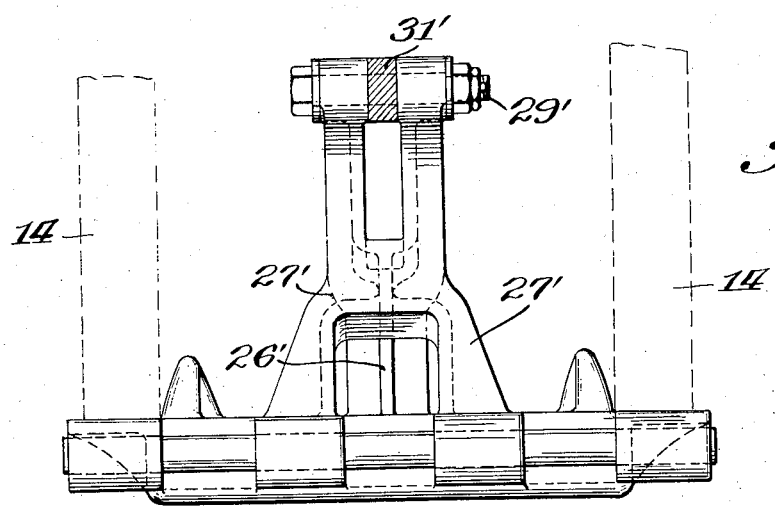
Fig. 9 is an end elevation and partial section taken generally on line 9—9 of Fig. 8.

A modified form of the invention is shown in Figs. 6, 7, 8 and 9. In this form of the invention truss arm 26' is bifurcated at its inner end and the truss arm 27' is bifurcated at both its inner and its outer ends. The truss arms 27' join the truss arms 26' and form a triangular truss member having a space between the ends of the bifurcated truss arms to receive a link 31' which is pivotally mounted upon pivot pin 29' and having a longitudinal slot 32' at its opposite end for engaging the pivot pin 28' of the adjacent shoe. The space between the inner ends of the bifurcated truss arms is sufficiently large to receive the link 31' when the angle between the shoes is decreased and the pivot pin 28' moves along the longitudinal slot in link 31'. This construction is similar to the preferred embodiment of the invention and its essential details and possesses the same degree of simplicity, lightness and compactness and the ability to collapse about a relatively short radius.

Having described the nature and embodiments of my invention, what I desire to secure by United States Letters Patent is as follows:

1. A track chain for a vehicle including a plurality of tread members, bearing lugs integral with said tread members, pintles extending through said bearing lugs pivotally to interconnect the tread members in series, truss members extending inwardly from each tread member, each truss member having a substantially vertical side at one end of the tread member and a side substantially sloping towards the other end of the tread member and being provided with an integral head which overhangs the sloping side to provide a recess adapted to receive the head of an adjacent track element when the track chain is folded up, pivots on each head, one pivot being located in the overhanging portion of said head and the other pivot being located adjacent the vertical side of the truss arm and being located at a lower level than the first said pivot, links pivotally mounted on the first said pivots and having slidable connection with the second said pivots of adjacent truss arms, whereby said links have their slotted ends deflected outwardly toward the tread members when the track chain is folded about its tread pintles.

2. A track chain for a vehicle including a plurality of tread members pivotally interconnected in series, truss members extending inwardly from each tread member, each truss member having a substantially vertical side at one end of the tread member and a side substantially sloping towards the other end of the tread member and being provided with an integral head which overhangs the sloping side to provide a recess adapted to receive the head of an adjacent track element when the track chain is folded up, pivots on each head, one pivot being located in the overhanging portion of said head and the other pivot being located adjacent the vertical side of the truss arm and being located at a lower level than the first said pivot, links pivotally mounted on the first said pivots and having slidable connection with the second said pivots of adjacent truss arms, whereby said links have their slotted ends deflected outwardly toward the tread members when the track chain is folded.

3. A track chain for a vehicle including a plurality of tread members pivotally interconnected in series, tripodal truss members extending inwardly from each tread member, each truss member having a substantially vertical side at one end of the tread member and a side substantially sloping towards the other end of the tread member and being provided with an integral head which overhangs the sloping side to provide a recess adapted to receive the head of an adjacent track element when the track chain is folded up, pivots on each head, one pivot being located in the overhanging portion of said head and the other pivot being located adjacent the vertical side of the truss arm and being located at a lower level than the first said pivot, links pivotally mounted on the first said pivots and having slidable connection with the second said pivots of adjacent truss arms, whereby said links have their slotted ends deflected outwardly toward the tread members when the track chain is folded.

ISAAC H. ATHEY.